Patented Nov. 9, 1937

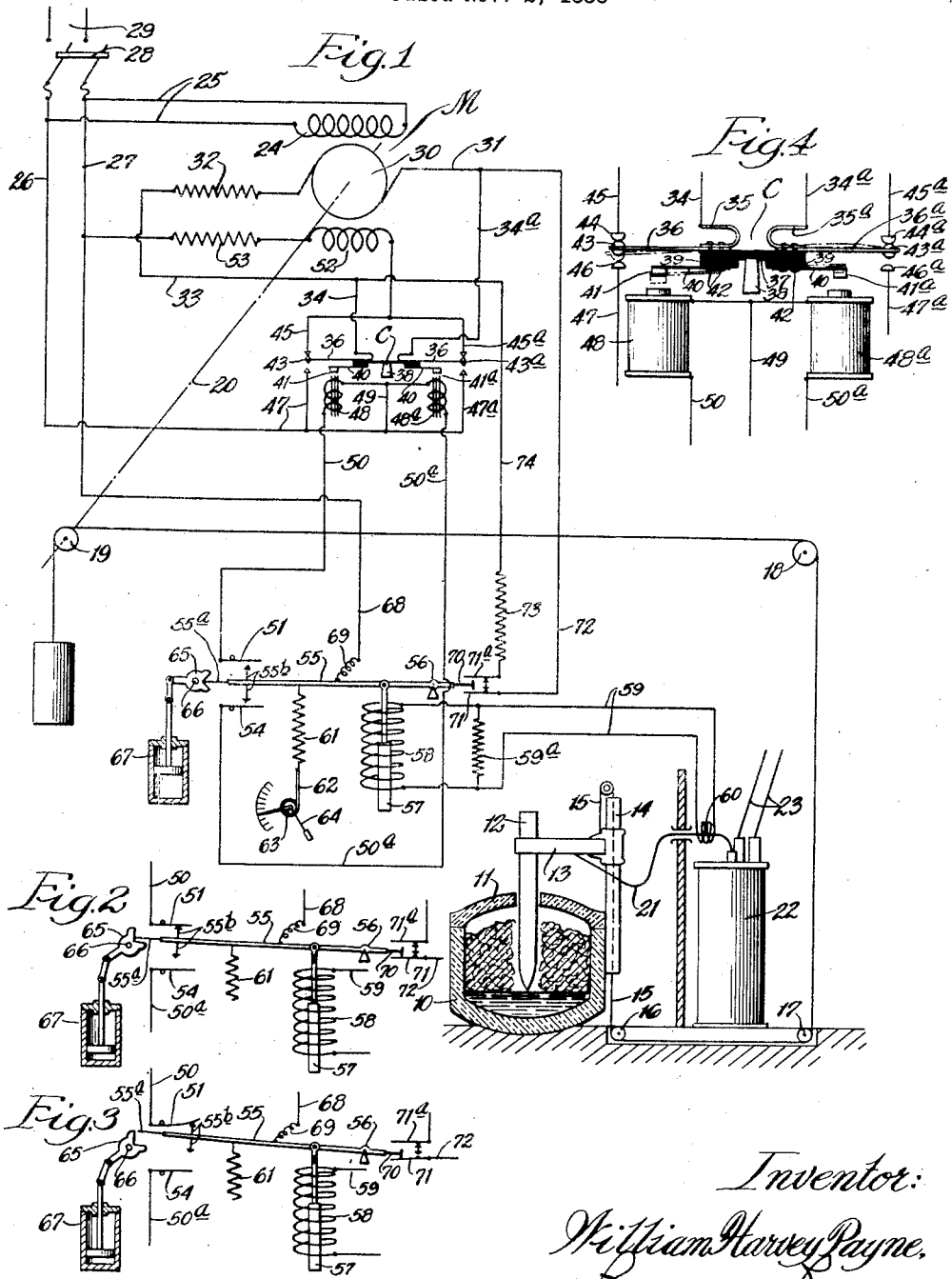

2,098,672

UNITED STATES PATENT OFFICE 2,098,672

AUTOMATIC ELECTRIC ARC FURNACE ELECTRODE CONTROL

William Harvey Payne, La Grange, Ill.

Application November 2, 1936, Serial No. 108,739

8 Claims. (Cl. 13—13)

In an arc melting electric furnace of improved design it is customary to construct the furnace in such a way as to provide a crucible and a roof lined with refractories in which the charge is melted and finished. In such a furnace, electric heat is applied by arcing to the scrap and slag, the current being taken into the furnace through graphite or similar electrodes which in turn are clamp-supported to separate movable electrode arms which are mounted to slide up and down upon columns or similar supporting members fastened to the side of the furnace shell or parts thereof.

In the case of a three-phase arc furnace, each of the electrodes is individually power raised and lowered by means of cables or similar mechanical connections running to a motor driven electric winch or a reversible prime mover of like character. For hand movement of the electrodes, the prime mover is hand-switched to raise or lower the electrodes as the furnace operator may wish. The electrodes are thus hand-moved for all adjustments for charging, etc., but are automatically moved for the actual furnace melting operations.

The present invention is directed to the means for automatically controlling the motor winch or similar prime mover in such a way as to maintain a predetermined arc gap for the purpose of stabilizing the current flow under changing conditions within the furnace which will hereinafter be described more fully in detail.

Where the furnace is employed for melting down scrap or like irregular bodies or lumps of metal, the material presents very broken or irregular contact surfaces causing rapid and irregular electrode movements as the material melts down into a liquid body. Since the surface of the metal itself acts as one of the spark poles for the gap from the lower end of the electrode, it is evident that provision must be made for approximately constantly adjusting the height of the electrode in order that a uniform gap may be maintained between the electrode and the closest point in the mass of changing metal. From the beginning of a melting operation, such scrap will present points or projections with which the arc is established, and as the melting progresses, the arc from each electrode will melt its hole or cavity through the scrap, thus going down through the scrap charge very quickly. Molten metal, from these three first holes through the scrap charge, collects on the furnace bottom. Thus within about 15% of total melting time, the electrodes come through the cold charge and arc to the then formed pool of molten metal and slag on the furnace hearth, and from that time to the completion of the melting of the scrap this electric heat is put in underneath the remaining, bridged, charge above. Finally, this bridged scrap falls in. These large sections may fall against one or two electrodes, causing substantial short circuits and surging therefrom. These changes radically alter the arcing conditions within the furnace so that quick adjusting movements of the electrodes are necessary in order to maintain each electrode at the intended arcing distance. Especially quick and extensive automatic movements of the electrode are very desirable where scrap falls in as above.

Since the volume of current flow in amperes is ordinarily in inverse ratio to the length of the gap, it is evident that a control of this gap distance may be effected by means which are responsive to a variation in the current flow. The present invention, therefore, is directed to means which are delicately responsive to variations in the current flow, and which in turn control the forward and reverse movements of the motor winch for raising and lowering the electrodes. I shall refer to such a controlling device as a contact making device, which in the present instance is in the nature of an electrically actuated switch which in its medial position occupies a gap or space equidistant between the contacts which respectively control the forward and reverse circuits leading to the winch motor. The movements of the contactor switch are electrically coordinated with the variations in the current flow through the electrode, which in turn is dependent upon the length of the arc gap. With the electrode current flow at a set rate, the contactor will occupy the medial position and the electrode motor winch will stand idle, but with an increase or decrease in the electrode current flow past the normal point, the contactor will close one or the other motor circuits and thus effect a mechanical lifting or lowering of the electrode to the extent necessary to reestablish normal conditions at the arc.

It is understood by those skilled in the art that an electrode speed too high for its controlling apparatus in combination will cause the electrodes to over travel in raising, and before the control combination can stop the movement, the arc will be broken. Similarly, on lowering at a speed too fast, the control combination will permit its electrode to over travel before it can stop the movement. This over travel, or arc breaking, is known as "electrode hunting".

With the above conditions in mind, the objects of this invention are to provide:

(a) Increased response sensitivity; equipment for automatic control of electric arc furnace electrodes used up to this date, dampens their contact making device rocker bar through all of its movement. I get much higher response sensitivity of my contact making device as is hereinafter described, because I dampen the rocker bar movement only when said bar is passing through its medial or neutral position, in its cycle of movements. Thus when a correction movement contact is made, my design is entirely undampened to break the contact. Being undampened to break the contact for raising or lowering, my design will stop its electrode without any delay the instant that the current value in the contact making device arrives at the desired setting.

(b) My invention offers a much simpler and more accurate method of changing electrode speeds in exact relation to the degree of current flow under or over the medial or normal set value. For instance, current flow greater than approximately 15% above setting will pull the rocker bar of my contact making device quickly to extreme position and break another contact to increase the motor winch speed. Likewise, current flow under approximately the above percentage or zero will permit the balance spring to pull the rocker bar to the extreme low position, and in the same manner increase the motor winch speed, until the device in combination reestablishes current flow at the intended volume.

(c) Part of the equipment in combination for automatically controlling the movements for arc furnace electrodes is that which permits the operator to vary the setting of the current flow as is desired. It is known to those skilled in the art that the ordinary way of doing this is to have mechanically large current adjusting rheostats in parallel with the current coil circuits. Thus the change of setting by the operator is ordinarily made by changing the position of these large current adjusting rheostats. Power cost to an industrial plant is ordinarily based on load factor. Thus it is important to cut off the peaks of the plant demand. I refer to my new method hereinafter described, which is much simpler and takes approximately ten percent of the power to operate as a means of automatically changing the adjustment on contact making device in order to keep the plant demand as low as possible. I refer to my method as is hereinafter described, wherein I can vary the input setting by changing the tension of the balance spring of the rocker bar in my new contact making device.

Further objects and details of the invention will appear from the description thereof in conjunction with the accompanying drawing, wherein,—

Figure 1 is a diagrammatic view showing an arc melting furnace under the control of the devices forming the subject matter of the present invention, with the rocker bar in mid position and the hoist motor at rest;

Fig. 2 is a partial view of the same showing the rocker bar raised so as to make contact with the upper rocker bar switch;

Fig. 3 is the same showing the rocker bar in extreme upper position; and

Fig. 4 is a partial enlarged detail of the motor reversing contacts.

The embodiment illustrated comprises an arc melting furnace 10 having a cover 11 through which passes a plurality of electrodes of which only one electrode 12 is shown. This electrode is carried by an arm 13 which is slidably mounted on a hollow support 14. The electrode and its supporting arm are raised and lowered by means of a cable 15 passing over suitable pulleys 16, 17, 18, and driven by a sheave 19 from a reversing hoist motor M keyed on a shaft 20. The current is fed to each of the electrodes 12 and arms 13 through a flexible lead 21 from a power transformer 22 which receives power from a suitable source through leads 21.

The motor M has a shunt field 24 which connects through leads 25 with leads 26, 27, which in turn connect through a motor switch 28 with a suitable source of power 29. An armature 30 keyed on the shaft 20 connects through brushes with a lead 31 at one side and a breaking resistance 32 at the other. The breaking resistance connects through leads 33, 34 with a flexible connector 35 of the motor reversing contact C (Fig. 4). This flexible connector makes electrical contact with a metal bar 36, the two being riveted to the upper side of a glass plate 37 which is balanced across a stationary ledge 38. A smaller glass plate 39 lies at each end of the glass plate 37, and beneath this is placed a member 40 which carries an iron armature 41. The parts 35—36—37—39 and 40 are secured together by means of rivets 42. A contact 43 is carried on the outer end of the metal bar 36, and when the bar is up, as shown in full lines in Fig. 4, this contact is in engagement with a stationary contact 44 to which is connected a lead 45. A stationary contact 46 lies beneath the contact 43 and connects through a lead 47 with the lead 26.

Beneath the armature 41 is located a magnet coil 48. One side of this coil connects through a lead 49 with the lead 47, while the other side of the coil connects through a lead 50 with an upper spring contact 51 on the rocker bar.

The other side of the motor reversing contact is similar to the one just described, the parts on the right side being similar to those on the left, and are given the same reference numbers with a suffix $a$.

From the foregoing it will be seen that as the magnet coil 48 is energized it will draw the armature 41 down but not into contact with its core. The plate 37 with its associated parts will then be rocked somewhat in a counter-clockwise direction, so that the contact 43 will pass out of engagement with the contact 44 and into engagement with the contact 46, as shown in dotted lines. On the other hand, when the magnet coil $48^a$ is energized, it will draw down its armature $41^a$, thereby moving the contact $43^a$ out of engagement with the contact $44^a$ and into engagement with the contact $46^a$.

The leads 45, $45^a$ connect to one end of a series field 52, the opposite end of the field being connected through a starting resistance 53 with the lead 27. The lead $34^a$ connects to the lead 31. The lead $50^a$ connects to a lower spring 54 of the rocker bar which will now be described.

A movable switch element in the form of a rocker bar 55 is pivotally mounted at 56, and is pivotally connected to an iron core 57 of a solenoid 58. This solenoid has leads 59 by which it is connected to a current transformer 60, which is associated with the lead 21 in establishing a control circuit for the rocker bar. Thus the current flowing through the latter induces a current in the current transformer, and this serves to energize the solenoid 58 in proportion to the current flowing through the lead 21, with the result that the pull of the core 57 on the bar 55 is substantially in proportion to the current flowing through the corresponding electrode 12. The coil 58 is paralleled by a resistance 59ª, which is adjusted once and seldom readjusted.

A tension spring 61 is secured to the under side of the rocker bar, the opposite end of the spring being connected to a flexible member 62 which passes along a drum 63, the latter being movable by means of a lever 64 so as to increase or decrease the tension on the spring 61. This spring counteracts the thrust produced by the core 57, so that the two are balanced or substantially so when the rocker bar 55 is in a mid position corresponding to a desired strength of current flowing through the electrode. This provides a method for varying the input setting in simple and effective manner, which permits the operator to vary the current flow as desired without the necessity of employing a rheostat or other complicated equipment for a like purpose, and at the same time provides a mechanism which if desired may be automatically operated to control the plant demand, or load factor, of the particular industry using the electric furnace.

On the outer end of the rocker bar 55 is a rigid member 55ª. A cam 65 lies in the path of the member 55ª and is pivotally mounted at 66. The outer end of the cam lever is pivotally connected in a well known manner to a dash pot 67. This cam is frictionally mounted about its pivot point so that it will stand at any position at which it is left.

In Fig. 2 the rocker bar 55 is shown raised so that the member 55ª is just leaving engagement with the inner surface of the cam 65. At the same time the rocker bar 55 carries a contact finger 55ᵇ which is just making engagement with the upper spring contact 51. A lead 68 carries current from the lead 27 through a flexible lead 69 to the rocker bar which is of metal, and thence through the contact finger 55ᵇ with the upper spring contact 51.

The opposite end of the rocker bar 55 carries an insulating finger 70 which in the extreme position as shown in Fig. 3 is adapted to engage a switch member 71 and move it to open position as there shown. This member connects through a lead 72 with the lead 31, while the opposite switch contact connects through a similar switch member 71ª on the other side of the insulating finger 70 and thence through an armature speed shunt resistance 73 and through a lead 74 to the lead 34. When the switch members 71, 71ª are in position so that they contact across, the resistance 73 is in shunt with the motor armature, so that when crossed the armature runs at a slower speed than when either the switch 71 or 71ª is open. The means previously described in detail constitute two motor circuits for actuating the motor in the forward or reverse directions, depending upon the contacts established by the rocker bar or equivalent switch element.

The operation of the mechanism is as follows: With the rocker bar in mid position as shown in Fig. 1, no current flows through the armature of the motor, with the result that the motor is stationary. This corresponds to a predetermined normal current flowing through the electrode 12. As the charge in the furnace melts, however, portions of it frequently fall into engagement with the electrode, with the result that an excessively high current flows until the electrode is withdrawn from contact with the charge. Let us suppose, however, that a higher than normal current flows but not an excessive one. When this happens, the rocker bar 55 is drawn up and the contact finger 55ᵇ makes engagement with the upper spring contact 51, thereby passing current through the magnet coil 48, energizing the same and drawing the contact 43 down, as shown in dotted lines in Fig. 4. When this happens, current from lead 26 of the line 29 passes through the lead 47, thence through the contacts 46, 43, through the leads 34, 33, and resistance 32, through the armature 30, thence through the leads 34ª, the metal bar 36ª, the lead 45ª, through the series field 52, and through the resistance 53 to the lead 27. This causes the motor M to move the rope 15 in a direction to lift the electrode 12 at a moderate rate, and it will continue at that rate so long as a current of about the same intensity passes through this electrode.

Should some of the charge, however, fall against the electrode, an excessive current will immediately pass through the electrode, thereby causing the coil 58 to draw the core 57 up violently, as shown in Fig. 3, until stopped by the upper spring contact 51 which is preferably made yieldable so as to act as a yielding stop. When this occurs, the insulating finger 70 opens the switch member 71, as shown in Fig. 3, so that the resistance 73 no longer shunts the motor armature, and the motor accordingly speeds up so as to rapidly pull the electrode 12 away from the charge. As soon as the movement of the electrode is such that the excessive current in the solenoid 58 is no longer so heavy, with the result that the spring 61 is able to draw the rocker bar down first to the position shown in Fig. 2, and as the current flowing through the electrode returns to normal, the rocker bar returns to the normal position shown in Fig. 1.

Should current flowing through the electrode at any time fall somewhat below normal, exactly the reverse will take place and the contact 55ᵇ on the lower side of the rocker bar will engage the lower spring contact 54, and this will cause the magnet coil 48ª to be energized, thereby drawing down the armature 41ª which will pull the contact 43ª out of engagement with the contact 44ª and into engagement with the contact 46ª, with the result that the armature of the motor M will be driven in the reverse direction from that which has just been described, namely, one in which the electrode will be moved toward the charge. This will continue so long as this strength of current flows through the electrode. However, if the electrode approaches the charge so as to increase the strength of current flowing, the rocker bar will return toward its normal position.

In case the current flowing through the electrode is excessively small, the spring 61 will draw the rocker bar down so as to cause the insulating finger to lift the switch member 71ª, thereby stopping the flow of current through the resistance 73 and causing the motor M to move the electrode down at a higher rate, which will continue until the flow of current is again established through the electrode at its intended volume.

Damping the rocker bar in the middle portion of its swing prevents the combination from reversing its motor so fast as to abuse the motor. It will be observed that the damping occurs only at the medial position or center of the swing of the rocker bar and not at all after the rocker bar has moved nearly into contact with either the upper or lower spring contacts, and is entirely undamped to break such contacts, once made. Thus, in Fig. 2, the damping cam maintains the position shown until the rocker bar again attempts to pass through the middle position, when it resists that action until the rocker bar again moves almost but not quite into engagement with either the lower or upper spring contacts.

Although the control circuit shown and described is one which is responsive to the quantity of current passing through the electrode, I am aware that an adequate response for control purposes may be made to depend upon the voltage of the current or upon a combination of the voltage and amperage, so that it will be understood that in the claims where I refer to variations in the current flowing through the electrode I have in mind not merely variations in the quantity of current but also variations in the intensity, or in a combination of these two factors, either or both of which may be utilized for operating a rocker bar in a contact making device to which my special dampening and speed change principle may be attached.

It will also be understood that although I have shown and described a spring whose tension is adjustable to oppose the action of the solenoid in regulating the movements of the rocker bar, I do not intend to be limited to a spring, since other similar or equivalent means may be employed for a like purpose, and that a spring has been shown primarily for the reason that it affords a convenient means for permitting the necessary adjustments to be made to establish a normal setting for the rocker bar in relation to current conditions within the electrode circuit, and enables readjustments to be made either manually or automatically in relation to such current conditions.

It will also be understood that where I refer in the claims to motor circuits, such an expression is intended to cover and include all devices or instrumentalities employed for maintaining a forward or reverse current flow to the motor, depending upon the setting of the current closing element immediately actuated by the control circuit. Thus it will be seen that I have provided a very simple and efficient means for automatically maintaining the current flow in a furnace of this type at or near a desired level.

While I have shown and described but a single embodiment of this invention, it is to be understood that it is capable of many modifications. Changes, therefore, in the construction and arrangement may be made which do not depart from the spirit and scope of the invention as described in the appended claims.

I claim:

1. In combination with an electric furnace having a movable arcing electrode and a support therefor and a current-carrying conductor for said electrode, a reversible prime mover adapted to raise and lower said electrode to maintain an arcing gap of desired length, a control circuit responsive to variations in the current flowing through the electrode, motor circuits for imparting raising and lowering movements to the prime mover, a contact making device responsively actuated by current variations in the control circuit and adapted to stand in open circuit breaking relation to both motor circuits when the electrode current is flowing at substantially normal rate and to close one or the other of the motor circuits when the electrode current varies from set normal, and damping means for retarding the movements of the contact making device only when moving in either direction through an intermediate range on either side of and including the neutral position and being entirely undamped in the circuit closing and breaking positions.

2. In combination with an electric furnace having a movable arcing electrode and a support therefor and a current-carrying conductor for said electrode, a reversible prime mover adapted to raise and lower said electrode to maintain an arcing gap of desired length, motor circuits operably connected thereto, a control circuit responsive to variations in the current flowing through the associated electrode, a contact making device for said electrode responsively actuated by current variations in the control circuit and including a movable switch for actuating one or the other of the motor circuits for driving the prime mover in the corresponding direction, and damping means for retarding the movements of the switch element only when moving in either direction through an intermediate range on either side of and including the neutral position, the switch element being undamped in the circuit closing and breaking positions.

3. In combination with an electric furnace having a movable arcing electrode and a support therefor and a current-carrying conductor for said electrode, a reversible electric motor to raise and lower said electrode to maintain an arcing gap of the desired length, motor circuits operably connected thereto, a control circuit responsive to variations in the current flowing through said electrode, a contact making device for said electrode actuated by current variations in the control circuit and including a movable switch for closing one or the other of the motor circuits for driving the electric motor in the corresponding direction, damping means for retarding the movements of the switch element only when moving in either direction through an intermediate range on either side of and including the neutral position, the switch element being entirely undamped in the circuit closing and breaking positions, a resistance in each motor circuit and means operable by the movable switch at either extreme of its movement to open the associated circuit through the resistance to cause the motor to increase its speed.

4. In combination with an electric furnace having a movable arcing electrode and a support therefor and a current-carrying conductor for said electrode, a reversible prime mover to raise and lower said electrode to maintain an arcing gap of the desired length, motor circuits operably connected thereto, a control circuit responsive to variations in the current flowing through the associated electrode, a contact making device for said electrode responsively actuated by the control circuit and including a movable switch for closing one or the other of the motor circuits for driving the prime mover in the corresponding direction, damping means for retarding the movements of the switch element only when moving in either direction through an intermediate range on either side of and including the neutral position, the switch being entirely undamped in the circuit closing and breaking positions, and means for operating the prime mover at higher speeds at either extreme position of the movable switch.

5. In apparatus of the class described, an arc melting electric furnace having an arcing electrode, means including a reversing motor for raising and lowering said electrode with respect to the charge to be melted, a motor reversing contactor operably connected to the motor for reversing the same, means for operating the contactor including a rocker bar, a solenoid operable in one direction by changes in current flowing through the electrode to move the rocker bar in a corresponding direction, spring means opposing the action of the solenoid and adapted to move the rocker bar in the opposite direction, switches operable by the rocker bar for operating the reversing contactor, and means for damping the movements of the rocker bar at or near its neutral position only, the rocker bar being entirely undamped while making and breaking either contact.

6. In apparatus of the class described, an arc melting electric furnace having an arcing electrode, means including a reversing motor for raising and lowering said electrode with respect to the charge to be melted, a motor reversing contactor operably connected to the motor for reversing the same, means for operating the contactor including a rocker bar, a solenoid operable by changes in current flowing through the electrode and adapted to move the rocker bar in one direction, spring means opposing the action of the solenoid and adapted to have the rocker bar in the opposite direction, switches operable by the rocker bar for operating the reversing contactor, means for damping the movements of the rocker bar at and near its neutral position only, the rocker bar being entirely undamped while making and breaking either contact, means for operating the motor at a given speed at intermediate positions in the rocker bar, and means for operating the motor at higher speeds at extreme positions of the rocker bar.

7. In apparatus of the class described, an arc melting furnace having a plurality of electrodes, means including a reversing motor for raising and lowering each of the electrodes with respect to the charge to be melted, a motor reversing contactor operably connected to the motor for reversing the same, means for operating the contactor including a rocker bar, a solenoid operable by changes in current flowing through the electrode and adapted to move the rocker bar in one direction, spring means opposing the action of the solenoid and adapted to move the rocker bar in the opposite direction, switches operable by the rocker bar for operating the reversing contactor, means for damping the movements of the rocker bar at and near its neutral position only, the rocker bar being entirely undamped while making or breaking either contact, means for operating the motor at a given speed at intermediate positions of the rocker bar, a resistance in shunt with the motor armature, and means operable by the rocker bar at either end of its extreme swing to open the circuit through the resistance to cause the motor to increase its speed.

8. In combination with an electric furnace having a reversibly movable electrode, a support therefor, conductors for maintaining a current therethrough, and a reversible prime mover for moving the electrode, motor circuits for effecting forward and reverse movements in the prime mover, a contact-making device for closing one or the other of said motor circuits, said device being responsive to variations in current flow through the electrode, said contact-making device including a rocker bar, means for damping said rocker bar while moving through a short range about its neutral or circuit breaking open position and adapted to leave the rocker undamped for making and breaking contacts in either direction, and means actuated by the extreme movements of the rocker bar representing the highest load or zero load to increase the speed of the prime mover during extreme variations from its normal arcing position.

WILLIAM HARVEY PAYNE.